United States Patent [19]
Saint Eve et al.

[11] 3,888,609
[45] June 10, 1975

[54] APPARATUS FOR PRODUCING FILMS IN ACCORDANCE WITH THE BLOWN TUBE PROCESS

[75] Inventors: Daniel R. Saint Eve, Thornhill, Ontario; Ajit Kumar Bose, Don Mills, Ontario, both of Canada

[73] Assignee: Leco Industries Limited, St. Laurent, Quebec, Canada

[22] Filed: May 11, 1973

[21] Appl. No.: 359,563

Related U.S. Application Data
[63] Continuation-in-part of Ser. No. 79,754, Oct. 12, 1970, Pat. No. 3,754,067.

[52] U.S. Cl. .................. 425/72; 264/95; 425/326; 425/388
[51] Int. Cl. .................. B29c 25/00; B29f 3/08
[58] Field of Search .......... 425/326 R, 387, 388, 72, 425/445; 264/95, 98, 99

[56] References Cited
UNITED STATES PATENTS
3,544,667  12/1970  Ebert et al. .................. 264/95 X
3,568,252  3/1971  Masuda et al. .................. 264/95 X FOREIGN PATENTS OR APPLICATIONS
6,707,257  11/1967  Netherlands .................. 264/95

Primary Examiner—Andrew R. Juhasz
Assistant Examiner—William R. Briggs
Attorney, Agent, or Firm—Lawrence I. Field

[57] ABSTRACT

The invention provides a novel apparatus for producing, by blown tube process, novel film having improved balanced characteristics. The film is characterized by crystallites dispersed throughout the film in amorphous areas and which is substantially free of crystalline formation, as well as having other improved mechanical properties. The apparatus employs a first cooling chamber for acting on the molten tube following extrusion for cooling the tube to a temperature above the crystalline formation temperature, an annealing chamber located downstream from the first cooling chamber and a second cooling chamber located downstream of the annealing chamber to initiate solidification of the tube.

12 Claims, 2 Drawing Figures

Fig. 1

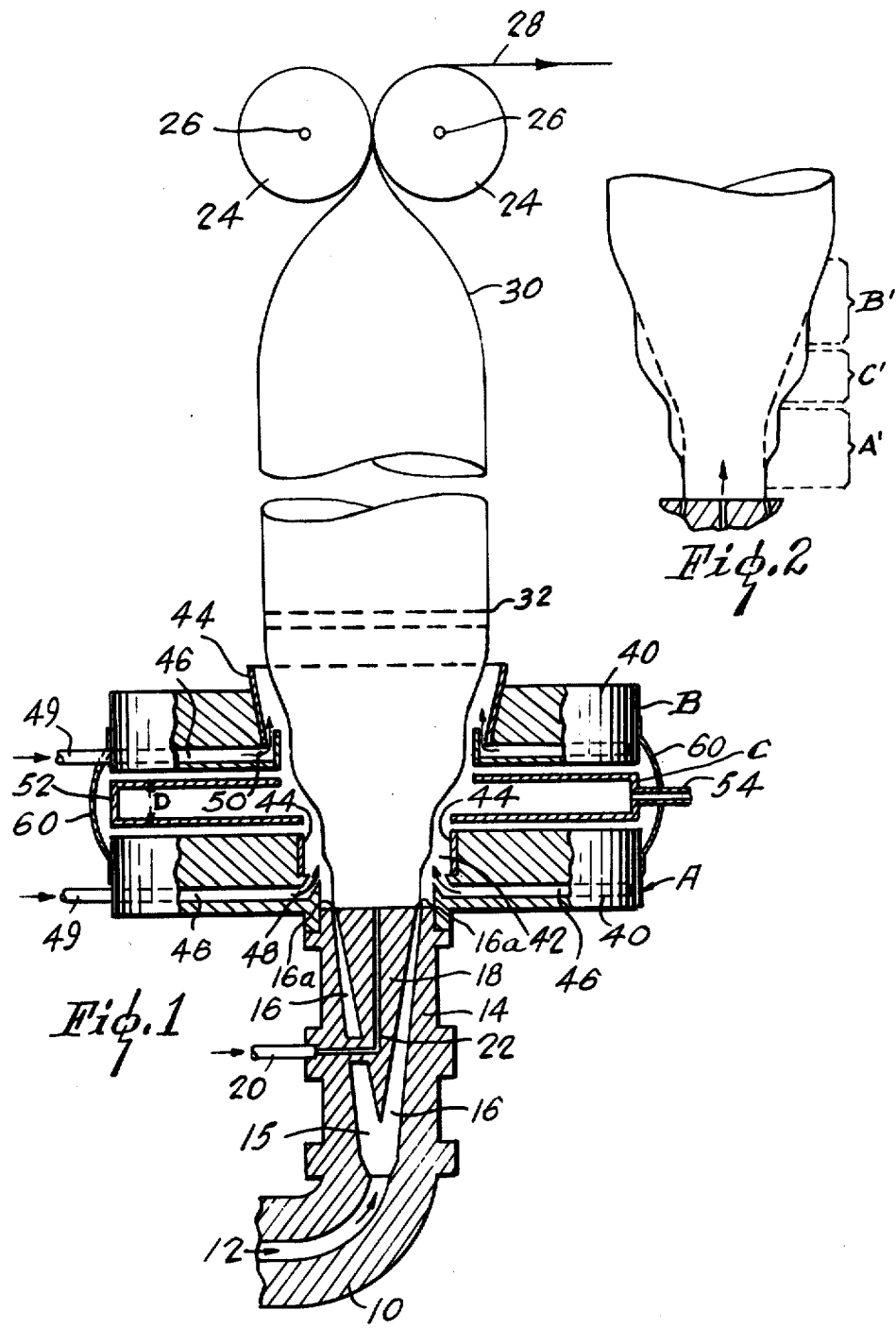

APPARATUS FOR PRODUCING FILMS IN ACCORDANCE WITH THE BLOWN TUBE PROCESS

This application is a continuation-in-part of my copending application Ser. No. 79,754, filed Oct. 12, 1970, now U.S. Pat. No. 3,754,067, relating to Improvements in Blown Tube Production.

The invention relates in general to certain new and useful improvements in thermoplastic film and tubing and more particularly, to film and tubing having amorphous areas with crystallite formation therein.

In the present specification, for ease of understanding and description of and illustration of the invention, reference will be made to polyethylene as a typical extrudable film-forming thermoplastic resin, since it is one of the most common materials in use today for such purposes; however, it will be understood that the invention is not limited thereto, as described hereinafter.

Film and tubing of polyethylene, and other similar materials, finds many uses in various and diversified fields, e.g. the packaging art, the construction industry, etc. Depending on its particular use, different properties are required; for example, in the packaging field, some uses require the material to be "shrinkable" — e.g. in shrink packaging where a wrapper or label is applied to a commodity so that it assumes the contour of the commodity after a film- or tube-shrinking treatment. Other requirements for film or tubing, either alone or in combination with the "shrink" characteristics, include high gloss (optical) and/or low haze (frostiness), usually together with good tensile strength, good elongation, good secant modulus and good impact strength properties.

The above characteristics are well defined in the art and briefly summarized, the term shrink or shrinkable describes film or tubing capable of being shrunk in overall area upon suitable activation — e.g. normally by heat treatment (which is generally carried out after the film or tubing is placed in situ — e.g. about an article or commodity).

Low haze characteristics of a product are highly desirable, as otherwise the transparency of the tube or film is impaired making it of limited value. High gloss is desirable in other products to provide a commercially desirable appearance. The tensile strength of film and tubing must also be sufficient to withstand normal handling in use without rupturing. The secant modulus, tied in with the impact strength characteristic, must be sufficient so that the film or tubing has good stiffness, but yet is flexible enough to permit use for packaging, etc. In the case of impact strength, the film or tubing must have sufficient characteristics to enable it to be handled and used without rupturing due to brittleness, and for being "contoured" about a product.

Several of the above characteristics are influenced by the fact that polyethylene resin, when manufactured, as with other similar materials, possesses a degree of crystallinity which varies according to the type of process (e.g. batch, J-type reactor) by which it was produced. In homopolyethylene of a low density type, the degree of crystallinity will be, e.g., between 50 – 60%.

Conventionally, a large percentage of film and tubing is made by what is known in the art as the "blown tube" or "blown bubble" method. The actual details are well known to those skilled in the art and reference may be had to, e.g., Canadian Pat. No. 460,963 illustrating such a method. Briefly, the method involves extrusion of an extrudable film-forming resin, using an extruder, through an extrusion die to form a bubble or tube, which is then blown up (using a differential air pressure between the interior of the bubble and atmosphere) to a desired size. The bubble or tube may be slit after solidification to form film (sheeting). In the conventional process, the molten bubble after extrusion is acted on by a single cooling means. In other conventional processes, a pair of cooling means may also be employed, as for example in U.S. Pat. No. 3,568,252.

The properties of blown tubing or film of polyethylene vary considerably (depending on various extrusion conditions — e.g. melt temperature). Even operating under optimum conditions for any given property desired, the properties of e.g. low density polyethylene may be generally stated to result in a haze percentage of 6 to 8% (measured by ASTM test D-1003-61; excellent being 0 – 5%, good being 5 – 10% and poor being 10% and higher); gloss percentage of 90 to 100% (measured by ASTM test D-523-53T; excellent being 90 – 105%, good being 75 – 89%, and poor being 74% and lower); tensile strength averages of between 2000 to about 2800 psi (based on an average of machine direction and transverse direction; values of 2000 to 2900 psi being excellent; good being 1700 to 2000 psi, and poor being below 1700 psi); a secant modulus of about 30,000 (excellent being 29,000 to 31,000); impact strengths of about 60 grams/mil (1 mil thickness) (excellent being 56 – 64 grams/mil) and shrink characteristics where the ratio of machine direction (MD) to transverse direction (TD) is between about 8:1 to about 5;1, with averages of 70% shrinkability in the MD and 20 to 30% in the TD. With the tensile strength characteristics (like the shrink feature) the blown tube or film normally has a far greater strength in the machine direction as opposed to the transverse direction, e.g. 2800 psi compared to 2300 psi.

It is known to those skilled in the art that improved gloss characteristics (within 90 to 105%) and haze (4 – 5%) can be obtained by increasing the melt temperature of the extruder and by increasing the frost line height of the blown tube; however, by doing so, there is a resulting large drop in the tensile strength, secant modulus and the impact strength characteristics of such films. Conversely, the tensile strength, impact strength and secant modulus of the product can be increased but only at the expense of the haze characteristics (to between about 10 to 20%) and gloss characteristics (between 75 to 89%).

Conventional blown tubing or film likewise can be produced, according to existing technology, where there is a vast differential between the shrink characteristics in the transverse direction as opposed to the machine direction (the direction in which the tube is extruded from the extruder and wound up). This is due to an inherent characteristic of the blown tube process, in that the molten tube must be stretched longitudinally (in the machine direction) between 5 to 8 times that which the bubble is transversely expanded (using a differential air pressure) in order to obtain a stable bubble during production; and further by using a blow ratio of at least 1.5:1. Consequently, such film or tubing when shrunk will preferentially shrink in the machine direction, which of course necessitates corresponding allowances in dimensions for packaging purposes, etc. Still further, it is very difficult to provide shrink film containing indicia which when shrunk, will produce a product having clear and legible indicia thereon.

Optimum characteristics for versatile tube or film would desirably be a haze percentage of between about 0 to 5%, gloss characteristics of 90 to 105%, tensile strength average of about 3,000 psi (with the strength in both the machine direction and transverse direction being substantially equal), a secant modulus of about 30,000 and an impact strength of at least 60 grams/mil (1 mil thickness).

Likewise, optimally, the shrink characteristics of film or tubing should be such that the machine direction and transverse direction characteristics are substantially identical.

Many attempts and a large amount of research have gone into trying to improve and balance the properties of film and tubing without sacrificing one or more other properties — for example, post treatments of film have been attempted, but generally the tensile strength is lowered as a result or other properties are sacrificed. However, in general, none of the processes are very successful.

With this invention, Applicant has developed a very simple, economical and practical apparatus and process for producing film and tubing, using the blown tube process, which overcomes the disadvantages of the prior art processes and at the same time provides improved properties in the film or tubing.

According to one aspect of the present invention, film or tubing can be produced using the apparatus hereof so that an extrudable film-forming thermoplastic resinous material is extruded to form a molten tube or bubble by the blown tube process, and wherein the molten extruded tube is blown up to a desired size following extrusion. In accordance with the improvement in the apparatus utilized in the making of the tube or film, the apparatus allows for acting on the molten tube following extrusion, to cool the molten tube to a temperature above the crystallization formation temperature of the material. The molten tube is subsequently annealed for a time sufficient to permit the material to form amorphous areas therein, and thereafter the resulting molten annealed tube is again cooled to solidify the tube.

According to a further aspect of the present invention, in an apparatus suitable for producing film or tubing by the blown tube method, and wherein there is included at least one extruder, an extrusion die and means for causing a molten extruded tube to be blown up to a desired size following extrusion, there is provided the improvement comprising first cooling means adapted to cool a molten tube of material extruded from said die, said cooling means being adapted to be mounted in operative relationship to said die whereby a molten extruded tube is cooled by said cooling means after extrusion from said die, an annealing chamber in operative association with said first cooling means in which a cooled molten tube is annealed, and further cooling means in operative association with said annealing chamber for further cooling the annealed molten tube.

In accordance with the teachings of the present invention, it is possible to provide new polyethylene products; which in one embodiment is solidified amorphous polyethylene film or tubing having crystallites dispersed throughout said film in said amorphous areas, the film being substantially free of crystalline polyethylene; and in a still further embodiment an extruded polyethylene film or tubing having a more balanced machine direction:transverse direction ratio — e.g. between about 2:1 to about 1:1, the film being further characterized by a tensile strength average of the machine and transverse directions of at least 2800 psi, haze properties as measured by ASTM D-1003-61 of less than about 4% and gloss characteristics as measured by ASTM D-523-53T of at least 115.

Following the teachings of the present invention, there may be obtained film and tubing having improved properties through the application of relatively simple and economical techniques as compared to the proposed solutions of the prior art. The present invention lends itself to adaptation on existing blown tube type of equipment provided with modifications as described herein. The process of making the film in accordance with the present invention may also be carried out at rates of film and tubing production, while maintaining the improved characteristics of the products, superior to any other proposed system for obtaining products by the blown tube method, having only one or two of the characteristics desired in the product. A still further advantage of the present invention is that no extra steps are required to produce film having improved characteristics as in prior art proposals.

Without being limited to any theory, the present invention provides for the treatment of the molten material to first cause the formation of crystallites and permits the formation of amorphous material surrounding the crystallites whereafter the molten film is cooled to solidify the material substantially without any crystalline formation. During the formation of the crystallites most of the expansion of the molten tube is carried out which aids in the formation of a substantially uniform distribution and spacing of the crystallites which appear to have amorphous areas surrounding the crystallites — i.e. during expansion, the crystallites are stretched in both machine and transverse directions.

The step of crystallite formation is preferably substantially accomplished during the first cooling step, and is substantially completed following annealing of the molten material. In some cases, it may be desirable to cause crystallite formation following initial cooling of the molten material — i.e. during the annealing stage, in which embodiment, the annealing stage will also include slight cooling action.

In all cases, the temperature of the molten material during the initial cooling and annealing stages is maintained above the crystalline formation temperature of the material being extruded, and desirably within a temperature range of from about 30°F. below the temperature at which the material is extruded but above the crystalline formation temperature of the material. As will be appreciated, the temperature may vary according to the specific type of material being used in the process, but generally speaking for polyethylene and other similar polymers or copolymers, the material will be cooled to between about −20°F. to about −100°F. from the temperature at which the material is extruded. The crystallite formation temperature — that is the temperature at which crystallites form in the material will vary depending on the particular material being used. These temperatures for different materials are known to those skilled in the art or may be readily determined. In the case of low density polyethylene, temperatures conducive to formation of crystallites, using a melt temperature of 320° to 350°F. are between about 290° to 320°F., which will vary depending on the specific type of resin used as the starting material.

The initial cooling step may be carried out by any suitable means, as for example by an externally applied gaseous cooling medium (typically air, having an appropriate temperature), solid cooling means — e.g. a cooling ring again having the appropriate temperature, etc. As will be understood by those skilled in the art, the temperature of the first means used to cause cooling in the first cooling step will vary depending on factors such as extrusion speed of the film, melt temperature, etc. Preferably, the first cooling step is carried out using air as a gaseous cooling medium and under conditions such as a minimum volume of air having a medium velocity is employed. Following this procedure, the gaseous cooling medium will also impart stability to the bubble.

During the first cooling step, and employing the conventional blown tube procedures, the molten tube will partially expand during the step. Thus, crystallites formed in the material will be subject to machine and transverse direction expansion.

The second step of annealing molten material is preferably carried out so that there is a minimum of disturbance created on the molten bubble. During the annealing step, heat is removed from around the molten bubble, which can expediently be accomplished by creating a partial vacuum externally surrounding the molten bubble. It has been found that where crystallite formation is permitted to occur during the first cooling step, the annealing step will permit amorphous areas to form and grow around the crystallites. However, as previously mentioned, crystallite formation may take place in the annealing stage by causing a slight cooling action of the molten bubble.

Desirably, the annealing operation is carried out in the presence of a partial vacuum and with the bubble subjected to a slight cooling action. The annealing step should also be carried out at a point removed from the first cooling step in the direction of travel of the molten tube.

It has been found, in accordance with this invention, that by employing a vacuum step in the annealing operation, additional stability is imparted to the bubble as will be hereinafter explained, and further that the bubble is permitted to expand by virtue of the partial vacuum which is believed to impart the additional stability.

The term "annealing" is often used in connection with the treatment of various materials such as glass or certain metals in order to render them less brittle. In this way strength is imparted to the material. Generally the annealing is carried out by heating the material and then subjecting the material to a slow cooling, or otherwise tempering through a gradually diminished heat. In this respect the thermoplastic films are annealed in accordance with the present invention, even though they are not subjected to the initial heating step. However, by subjecting the materials in their molten state after the initial cooling to a vacuum or a partial vacuum under the proper temperature conditions as described herein, and perhaps to a slight cooling effect, the films are annealed in that their strength is increased by rendering them less brittle. In this stage, only the sensible heat is removed from the film material. The annealing is carried out in an annealing chamber and the amount of vacuum and/or cooling is carefully adjusted so that only the sensible heat is removed and also to permit the tube to expand to the extent necessary to form crystallites therein after the initial cooling.

In the next step according to the present invention, the annealed molten product is subsequently permitted to solidify preferably by passing the molten tube through a further cooling step, whereby the molten material is transformed into a solidified tube substantially without the formation of any crystalline structures therein. During this last step, the molten tube is further expanded to the desired size. Preferably the last cooling step is carried out as a quench step, using a high volume low to medium velocity gaseous cooling medium, e.g. air. Desirably, the last cooling step is carried out at a point removed from the annealing stage.

In effect, applicant has found that the process of the present invention acts as a type of double extrusion process, wherein following extrusion, the molten tube is expanded to a first flow ratio size, wherein the molten tube is cooled to initiate the formation of crystallites while smoothing out any melt irregularities. Thereafter, following annealing wherein preferably only the sensible heat load is transferred to the atmosphere, the tube is subsequently expanded to the desired blow ratio size using a fast cooling step. In the final expansion, unlike the conventional blown tube process wherein molten material is extruded and which encounters die resistance, the present invention permits expansion under virtually neutral or relaxed melt conditions, whereby the final blow ratio is a combination of the initial and final expansion stages.

The process of the present invention is preferably carried out in an enclosed area whereby undesirable influences on the molten tube are eliminated. To this end, the first cooling step, the annealing step and the final cooling step may be carried out in a closed housing surrounding the molten tube at the appropriate positions.

Applicant has further found that desirably, the combined minimum blow ratio that should be employed for best properties in the extruded film is about 2.5, while blow ratios of 3.5 impart better balanced properties in the products while permitting higher outputs having good bubble stability during production.

It will be understood that during the first and final cooling steps, there may be employed more than one cooling stage to impart the desired degree of cooling to the molten bubble. However, this is not normally necessary as a single cooling stage can usually be employed to accomplish the desired cooling.

In carrying out the process of the present invention the apparatus according to a further aspect may include any suitable first cooling means adapted to cool the molten tube, following extrusion, to the desired temperature. Conventionally, such cooling means comprise means for supplying a gaseous cooling medium to the external surface of the tube, with suitable means for controlling the degree (amount) and velocity of the cooling medium. Desirably, the first cooling means is of a substantially similar construction to that hereinafter described with respect to the second cooling means. Suitable means may be provided for mounting the primary cooling means to the extrusion device, preferably at a point slightly removed from the point at which the molten material is extruded as an annular tube — i.e. from the extrusion die.

The annealing chamber may be in the form of an enclosed chamber having means for withdrawing the sensible heat load from the atmosphere surrounding the molten tube. In a preferred embodiment, the annealing chamber comprises an annular housing surrounding the tube with apertures therein adapted to permit the passage of the molten tube through the chamber, and with means for creating a partial vacuum in said chamber to permit the sensible heat load to be removed. It will be understood that the diameter of the apertures of the annealing chamber will be sufficient to encompass the annular tube, and preferably ½ to 1½ inches greater. Any suitable means may be employed for drawing a partial vacuum in the annealing chamber, such suitable means being, for example, an air pump. The air pump may be connected to the annealing chamber by means of one or more conduits. Preferably the air pump will have control to permit greater or lesser amounts of air to be withdrawn from the annealing chamber to allow for variances in the size and type of tube or film production.

The length of the annealing chamber may vary, and if desired, the housing may be made adjustable to compensate for various dwell times of the molten tube. The dwell times will be determined by the type of material being employed, the diameter of the tube, etc., and may be readily ascertained by those skilled in the art. Preferably, the annealing chamber is mounted at a position slightly spaced from the first cooling means, and to this end, any suitable mounting means may be employed for positioning the annealing chamber in operative relationship to the first cooling means.

A second cooling means is in the form of an annular zone, preferably being a continuous circumferential zone surrounding the molten tube at a point slightly spaced from the annealing chamber and in operative relationship therewith to permit a molten annular tube to pass therethrough. To this end, according to a preferred construction, the secondary cooling means comprises a housing having upper and lower apertures therein of a diameter sufficient to permit a molten tube to pass therethrough, means for supplying a source of a cooling gaseous medium to said housing, and means within said housing for directing said gaseous cooling medium preferably in the direction of movement of the annular molten tube. Desirably, the last-mentioned means is adjustable to permit variances in the direction of the gaseous medium onto the tube. Suitable means may be provided for mounting the second cooling means as, for example, brackets, or the like.

The source of the gaseous cooling medium may be provided for by conventional means, e.g. compressed air, which may be refrigerated if desired. The compressed air may be provided at varying velocities ranging from 1000 to 4000 feet per minute. Most desirably, in the first and second cooling means the gaseous cooling medium is supplied to the annular housing in the form of a circumferential ring, by means of a plurality of individual flow streams, to form a substantially continuous annular curtain of the cooling medium.

The type of equipment used in the extrusion of the film-forming extrudable resin and for maintaining the bubble in a blown condition, may be any suitable equipment known in the art for this purpose. In the case of single tube extrusion — that is non-laminated films, a single extruder is required to feed a molten resin to an annular extrusion die. The extrusion die may be a single channel conventional type or alternatively, may be a multi-channel type adapted to form a co-extruded tube consisting of two or more layers of film-forming extrudable resin. In the latter type of die arrangements, a single extruder with dual feed lines may be employed, or two or more extruders feeding different types of resins can also be employed to produce a co-extruded product having different properties depending on the different types of resins extruded.

The products of the present invention have superior properties to those which could otherwise be produced on the conventional blown tube type of process and apparatus. It is now possible to produce much better "balanced" film and tubing having excellent haze and gloss percentages, tensile strength averages, secant modulus and impact strength characteristics without sacrificing an improvement in one property for another. Moreover, the characteristics of such shrink film are improved. In the case of polyethylene of low density type, it is now possible to produce tubing or film having balanced properties where haze percentages of 3 to 4% (measured by ASTM D-100-3-61) may be obtained, gloss percentages of between 115 to 130 (measured by ASTM D-523-53T), tensile strengths between 2800 to 3000 or more and impact strengths of between 68 to 70 grams/mil (for 1 mil film), and shrink characteristics where the machine direction:transverse direction ratio is between about 2:1 to about 1.5:1.

Moreover, with the present invention, it is now possible to produce polyethylene film or tubing in which the morphology of the material is based on crystallites surrounded by amorphous areas with substantially no crystalline formation therein. The products are further characterized in that the film or tubing is in a substantially "relaxed" condition — in other words, there are no over-balanced stress-strain factors in a dormant form.

In carrying out the process of the present invention, improved characteristics can be obtained in a wide variety of films or tubing produced from different film-forming extrudable resins. Likewise, improved characteristics may be obtained in films or tubing consisting of two or more layers of co-extruded materials. To this end, the process may employ typical film-forming thermoplastic resins, or laminates of one or more of the following resins, polyethylene (all densities), polypropylene, copolymers of polyethylene with other comonomers, copolymers of polypropylene with other comonomers, cellulose acetate, cellulose acetate butyrate, ethyl cellulose, methyl methacrylate polymer, nylon (extrusion or molding grade) polystyrene, polyvinyl formalacetate butyral, copolymers of vinyl chloride and vinyl acetate (Vinylite), polyvinyl chloride (Geon), copolymers of vinyl chloride and vinylidene chloride (Saran) etc.

The resins employed may contain various types of conventional additives according to standard practices in this art, such additives being for example anti-block, anti-slip, etc. The present invention, as indicated, is particularly suitable for the production of film by the blown tube method; however, the tubing may be split during production thereof, whereby continuous film is obtained. The thickness of the extruded tube may vary according to conventional procedures and requirements — typical thickness ranging from 10.0005 inch and lower to several mils, e.g. 7 to 10 mils or more.

Having thus generally described the invention reference will now be made to the accompanying drawings illustrating a preferred embodiment and in which FIG. 1 is a schematic view of an apparatus according to the present invention; and FIG. 2 is a diagrammatic view showing the condition of the molten bubble as it passes through the cooling and annealing chambers.

Referring now in more detail and by reference characters to the drawings, S designates an extrusion system 10 constructed in accordance with the present invention and comprising a supply conduit 10 having a channel 12 therein for receiving molten extruded resin from an extruder, which connects to an extrusion die indicated generally by reference numeral 14. In FIG. 1, various components of a typical extrusion line have not been shown for the sake of simplicity, such components, for example, including the extruder and the wind-up roll, and the like. However, reference may again be made to the aforesaid Canadian Pat. No. 460,963 for the details of the blown tube process.

The extrusion die may be any conventional die such as a rotational die, or a stationary die. The size of the die will vary according to techniques and practices in this art. As previously mentioned, the die may be a co-extrusion die adapted to extrude two or more layers of molten material; and for simplicity only, a single layer extrusion die has been illustrated.

The die illustrated includes an aperture 15 for receiving the molten material from the conduit 12 and thereafter divides into an annular orifice channel 16 to form an annular ring of extruded resin at the discharge end 16a of the die. A conically shaped solid core 18 supported by a "spider", is positioned in the central portion of the die thereby to form the annular channel 16 with the exterior walls of the die.

It will be understood that the molten resin is introduced into the die under pressure which may be according to the conventional techniques. In the blown bubble method, a source of pressurized air is introduced into conduit 20 to air line 22 extending to the conical member 18 to direct a jet of air upwardly which is surrounded by the annular ring of film being extruded.

Spaced from the die 14 at a predetermined vertical height therefrom are a pair of rotatable rollers 24 mounted on drive shafts 26, driven by suitable means. It is at this point that the bubble or tube, inflated by the source of pressurized air, is collapsed to form a collapsed tube 28 which is then wound up on wind-up rollers (not shown).

The inflated bubble, generally designated by reference numeral 30, is maintained in an inflated condition by adjustment of the air pressure and other factors as will be understood by those skilled in this art. Once extruded from the die, the bubble or tube which is in a molten condition, solidifies at what is known as a "frost-line" in the art, shown by dotted lines 32.

In accordance with this invention, the first cooling step is carried out by providing a first cooling means, preferably in the form of an air ring designated by reference letter A. The annealing chamber is generally designated by reference letter C and the second cooling step is carried out by second cooling means, preferably in the form of a second air ring generally designated by reference letter B. In a preferred embodiment, both cooling means are of a substantially similar construction, and in the following description similar reference numerals designate similar components.

Each cooling means comprises an air ring having a housing 40 forming an enclosed chamber. Housing 40 includes an aperture 42 therein, which aperture is of a size sufficient to permit a molten extruded blown tube to pass therethrough, as will be evident from FIG. 1. The housing 40 also includes an internal wall 44, otherwise known as a chimney. Depending on the particular constructure of the air ring, the height of the chimney 44 may vary, and may be adjustably mounted on the housing to vary the angle between the bubble and the chimney. In the arrangement shown, the chimney 44 of ring A is commensurate with the height of the housing, while in the case of ring B, the chimney 44 extends beyond the housing 40.

Each air ring includes a circumferential air passage designated by reference numeral 46, connected to a source of pressurized air (not shown) which is introduced therein by means of a conduit 49. The air ring A also includes an adjustable air discharge opening or nozzle 48 and in like manner the air ring B includes a similar nozzle 50. The adjustment of the nozzle permits the flow of gaseous cooling medium to be directed at a desired angle onto the external surface of the molten film.

The air ring A may be mounted to the extrusion apparatus by any suitable means and in the arrangement shown, the air ring A is connected to the die. The air ring B may be mounted by means of brackets or other conventional fasteners to the extrusion assembly.

The above-described air rings A and B are of a type known as a "Venturi" type of air ring which because of their structure and operation, permit a molten bubble to expand outwardly. The expansion of the bubble, particularly during the second cooling step imparts additional stability to the bubble to permit an increased extrusion rate. However, the bubble may be acted on to cause expansion according to various other techniques.

The annealing chamber, indicated by reference numeral C, is mounted between air rings A and B, spaced-apart therefrom by a distance of about 4 inches. The chamber comprises housing 52, having a conduit 54 connected thereto at one end and at the other end to a vacuum source — e.g. a vacuum pump. The annealing chamber acts to draw the sensible heat surrounding the molten bubble or tube at this point, so as to permit the molten material to be annealed during this phase of the tube production. In using an annealing chamber of the type illustrated, the tube is also permitted to expand whereby the crystallites formed following the initial cooling step, may be further stretched.

As illustrated in FIG. 2, without the annealing chamber of the type described, the bubble would otherwise assume the configuration shown in dotted lines. This further expansion of the bubble also imparts additional stability. Thus, it can be observed that the bubble of thermoplastic film will be sujected to a first expansion in the region of the first cooling chamber A', a second expansion in the region of the annealing chamber C', and a third expansion in the region of the second cooling chamber B'. It can also be observed that relatively little expansion, if any occurs during the region of film travel from the first cooling chamber to the annealing chamber and during the region of film travel from the annealing chamber to the second cooling chamber.

EXAMPLE

The following example demonstrates the production of a novel polyethylene product, using the process and apparatus of the present invention. In this Example there was employed a polyethylene resin of low density; the extrusion apparatus employed was that illustrated in FIG. 1. In this case, the extruder was a standard 2½ inch 24:1 LD extruder connected to a 5 inch spider type die. The first cooling means was as shown in the drawings, having a diameter of about 8 inches; the second cooling means was also as shown in the drawings having an aperture therein of approximately 14 inches. The height of the first and second cooling means was 5 inches each. The annealing chamber had a height of 3 inches, and was spaced from each of the cooling rings by a distance of 4 inches. The gap between the annealing chamber and the cooling rings was closed by means of a sheet of film.

The polyethylene resin with the conventional additives therein, e.g. anti-block, was fed to the extruder and a bubble formed according to conventional procedures. The polyethylene had a melt temperature of about 340°F., and was extruded from the extrusion die at this temperature. The extrusion conditions were adjusted to provide a film thickness above the frost line of approximately 1.2 mils average.

The first cooling means was actuated to supply air as a gaseous cooling media under medium velocity (of 1000 feet per minute), and was directed against the film at a slight angle. During this initial cooling stage, as will be seen from FIG. 2, the molten bubble began to expand, and the temperature of the molten bubble was lowered to about 295°F. At this temperature, crystallites began to form in the molten bubble, which crystallites were stretched due to the expansion of the bubble during the first cooling step. Thereafter, the bubble was passed through the annealing chamber whereby the temperature of the bubble maintained at about 290°F., and as will be seen the bubble completed the first stage expansion whereby it had a blow ratio of approximately 1.7.

Following annealing, the molten bubble was then passed through the second cooling step wherein cool air was directed at a slight angle onto the molten tube to lower its temperature to about 160° – 180°F. Because of the type of second cooling means, further expansion of the bubble was carried out to a desired blow ratio size of 3.5 — i.e. during the second expansion step, the blow ratio was 1.8 over and above the original blow ratio.

The frost line of the material was approximately 26 inches above the die and extrusion was carried out at about 160 feet per minute.

It was found that the product obtained had substantially no crystalline sites in the material, but rather, consisted of a crystallite population surrounded by amorphous areas. The crystallite population, due to stretching, was expanded to provide a more or less uniform product.

The characteristics of the product were tested and it was found that the haze percentage, as measured by ASTM test D-1003-61, was about 3.5%, the gloss percentage, as measured by ASTM test D523-53T was 128%, the tensile strength average (of the machine and transverse directions) was 3250 psi, based on a machine direction strength of 3500 and a transverse direction strength of 3000, and an elongation percentage of 575%. The secant modulus of the film was 30,000 based on an average of machine and transverse direction, and the film had an impact strength of 68 grams per mil (based on a 1 mil sample). As will be seen such products possess vastly superior strength, optical and shrink characteristics compared to conventional prior art products, and the products were eminently suitable for high quality shrink film with substantially no distortion to printed indicia. Moreover, the product was also eminently suitable for high gloss wrappings for special products — e.g. bread, etc.

Additional tests were carried out using various types of ethylene copolymers and it was found that increases in the shrink, gloss, haze, etc. could be obtained over conventional products.

It will be understood that various modifications can be made to the invention without departing from the spirit and scope thereof.

Having thus described our invention, what we desire to claim and secure by letters patent is:

1. An apparatus for producing film by the blown tube process, wherein the apparatus includes at least one extruder and at least one extrusion die, the improvement comprising first and second cooling means, said first cooling means adapted to cool a molten tube of material extruded from said die, said first cooling means having a control chamber sized to receive said molten extruded tube for cooling same after extrusion from said die, said first cooling means being adapted to be mounted in operative downstream relationship to said die in the direction of movement of said film, said first cooling means adapted to cool said molten extruded tube to a temperature above the crystallization formation temperature of the material but at a temperature at which said tube remains in a molten condition and sufficient to permit the formation of crystallites in the material, an annealing chamber located substantially midway between said first and second cooling means and located downstream from said first cooling means in the direction of movement of said film, said annealing chamber being sized to receive the film from the first cooling means while still in a molten condition, means for providing a vacuum operatively associated with said annealing chamber to withdraw sensible heat from said film and to permit expansion of same to the extent necessary to form crystallites therein, said second cooling means being in operative association with and located downstream from said annealing chamber in the direction of movement of said film, said second cooling means also having a chamber sized to receive said film from said annealing chamber for further cooling and solidifying the annealed molten film, to thereby produce an amorphous film having crystallites dispersed throughout said film and which is substantially free of crystal formation therein.

2. An apparatus as defined in claim 1 wherein said first cooling means comprises means for directing a stream of cooling gaseous medium onto said molten film, said means being adapted to completely surround said film and permit the passage of the film through said chamber.

3. An apparatus as defined in claim 2 wherein said second cooling means is the same as said first cooling means, said second cooling means being adapted to direct a source of high volume low to medium velocity gaseous cooling medium onto said film.

4. An apparatus as defined in claim 3 wherein said first cooling means, said annealing chamber and said second cooling means are mounted in an enclosed area surrounding a film extruded from said extrusion die.

5. An apparatus as defined in claim 1 wherein said annealing chamber is an enclosed chamber adapted to surround a film extruded from said extrusion die.

6. An apparatus for producing film of thermoplastic material by the blown tube process, said apparatus comprising extrusion means, an extrusion die operatively associated with said extrusion means to permit the extrusion of a film of material, means permitting the formation of a bubble from said film of thermoplastic material, first and second cooling means, said first cooling means located downstream from said die in the direction of movement of said bubble, said first cooling means having a chamber sized to receive said bubble in a molten condition after extrusion of the thermoplastic material from said extrusion die, said first cooling means adapted to permit a first expansion of said bubble and to cool still in the molten condition, means for providing a vacuum for a second expansion of the bubble operatively associated with said annealing chamber, said vacuum means adapted to withdraw sensible heat from the bubble and to permit said second expansion of same to the extent necessary to form crystallites in the thermoplastic material, said second cooling means being spaced from said annealing chamber in the direction of movement of said bubble and having a chamber sized to receive the annealed bubble, and means operatively associated with said chamber in said second cooling means to cause a third expansion of the bubble and to further cool and solidify said annealed molten bubble to thereby form an amorphous film having crystallites dispersed throughout said film.

7. An apparatus as defined in claim 6 wherein said first cooling means comprises means for directing a stream of cooling gaseous medium onto said molten bubble, said means being adapted to surround said bubble and permit the passage of the bubble therethrough.

8. An apparatus as defined in claim 7 wherein said second cooling means is the same as said first cooling means, said second cooling means being adapted to direct a source of high volume low velocity gaseous cooling medium onto said tube.

9. The apparatus of claim 1 further characterized in that said first cooling means are adapted to cool said molten tube to a temperature between about 20°F to about 100°F below the temperature of the material during extrusion and to create a first expansion of said tube.

10. The apparatus of claim 6 wherein said first cooling means comprises means for cooling the molten tube to a temperature between about 20°F. to about 100°F. below the temperature of the material during extrusion.

11. The apparatus of claim 6 additionally comprising means for collapsing said tube upon solidification thereof.

12. An apparatus for producing film of extrudable thermoplastic material by the blown tube process, said apparatus comprising extrusion means, an extrusion die operatively associated with said extrusion means to permit the extrusion of a film of material, means permitting the formation of a bubble from said film of thermoplastic material, first and second cooling means, said first cooling means located downstream from said die in the direction of movement of said bubble, said first cooling means having a chamber sized to receive said bubble in a molten condition after extrusion of the thermoplastic material from said extrusion die, said first cooling means adapted to direct a stream of cooling gaseous medium onto said molten extruded bubble and to permit a first expansion of said bubble, said first cooling means cooling said molten extruded tube to a temperature between about 20°F to about 100°F below the temperature of the material during extrusion whereby said tube remains in a molten condition and forms crystallites in the material, an annealing chamber located substantially midway between said first and second cooling means, said annealing chamber being spaced from said first cooling means in the direction of movement of said bubble and being sized to receive the bubble while still in a molten condition, means operatively associated with said annealing chamber for providing a vacuum for a second expansion of the bubble, said vacuum means withdrawing a substantial portion of the stream of gaseous medium directed onto said molten bubble from said first cooling means, said vacuum means adapted to withdraw sensible heat from the bubble and to permit said second expansion of same to the extent necessary to form crystallites in the thermoplastic material, said second cooling means being spaced from said annealing chamber in the direction of movement of said bubble and having a chamber sized to receive the annealed bubble, and means operatively associated with said chamber in said second cooling means to direct a further stream of cooling gaseous medium onto said annealed bubble, said means causing a third expansion of the bubble and solidifying said annealed molten bubble to thereby form an amorphous film having crystallites dispersed throughout said film.

* * * * *